June 6, 1944.  H. A. BISSOUT ET AL  2,350,716
WELDING APPARATUS
Filed Dec. 13, 1939  3 Sheets-Sheet 1
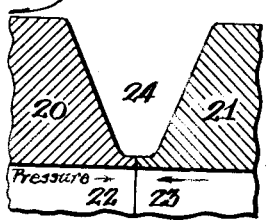
Fig. 1.
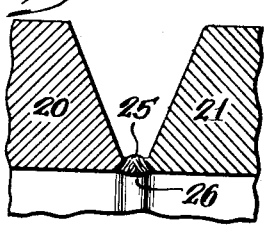
Fig. 2.
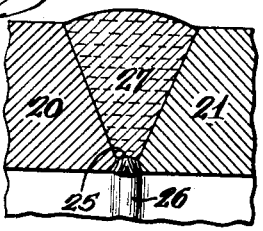
Fig. 3.
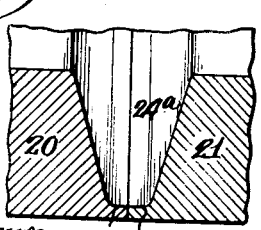
Fig. 1a.
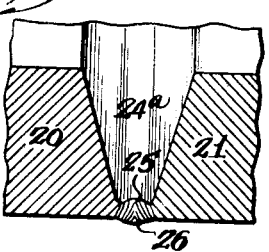
Fig. 2a.
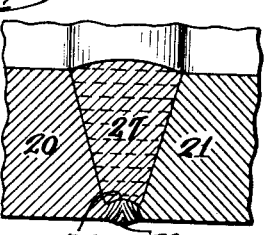
Fig. 3a.
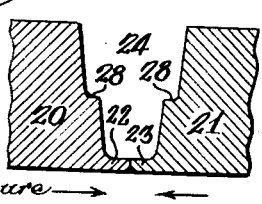
Fig. 1b.
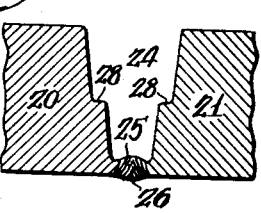
Fig. 2b.
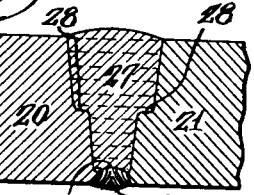
Fig. 3b.
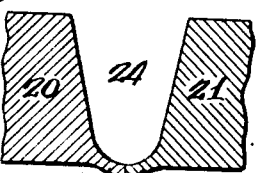
Fig. 1c.
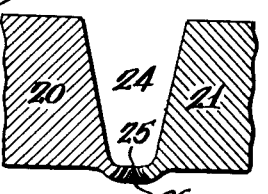
Fig. 2c.
Fig. 3c.
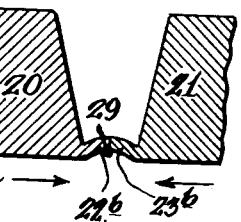
Fig. 1d.
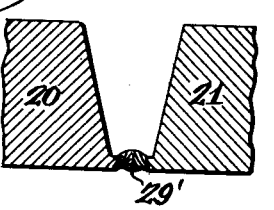
Fig. 2d.
Fig. 3d.
Witness:
Walter Ching.
Inventors.
Herbert A. Bissout and
William Y. Borresen
Attorneys.

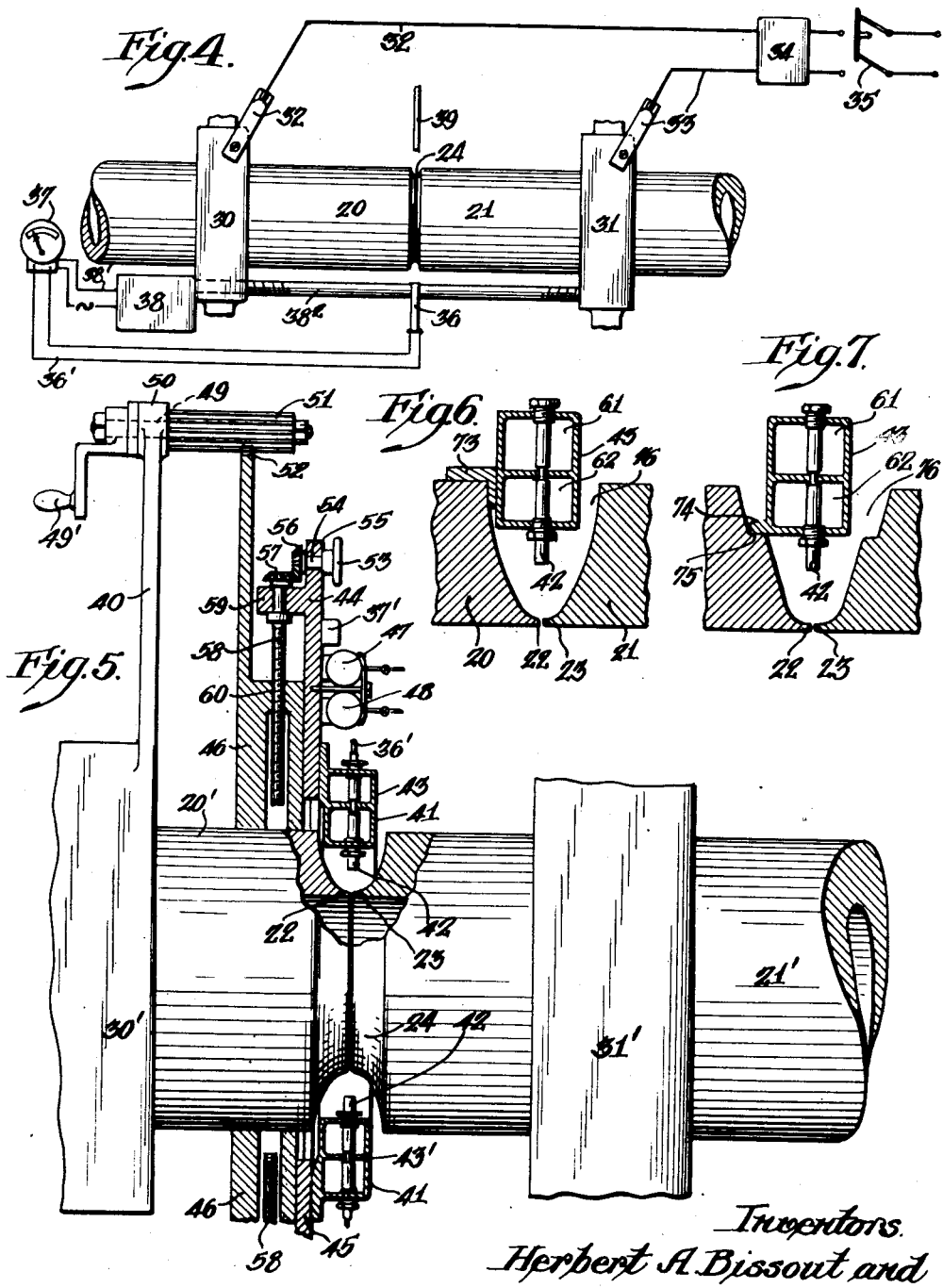

June 6, 1944.    H. A. BISSOUT ET AL    2,350,716
WELDING APPARATUS
Filed Dec. 13, 1939    3 Sheets-Sheet 3
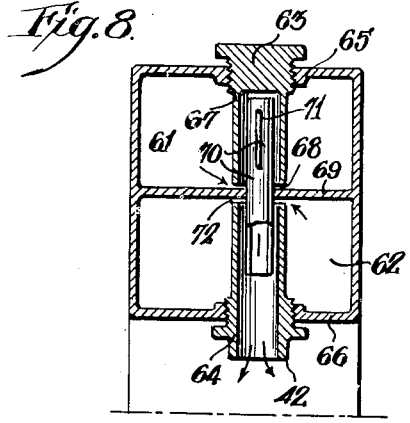
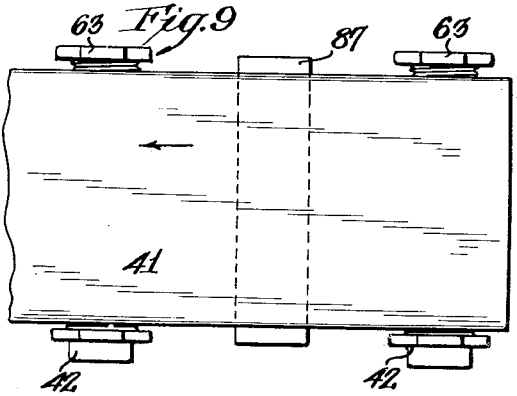
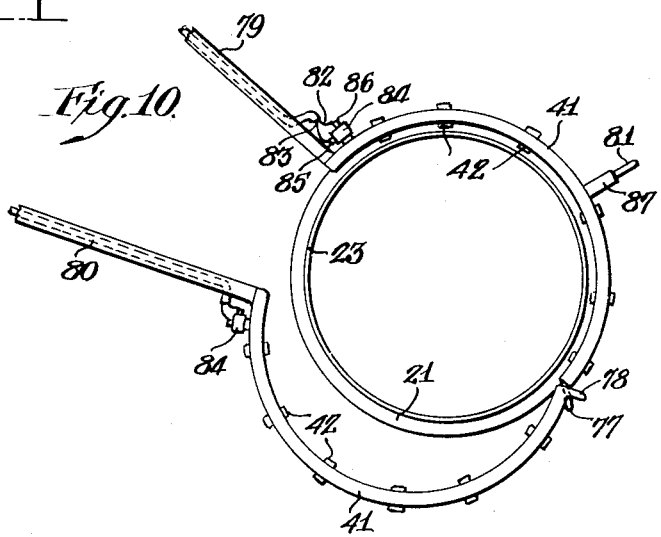
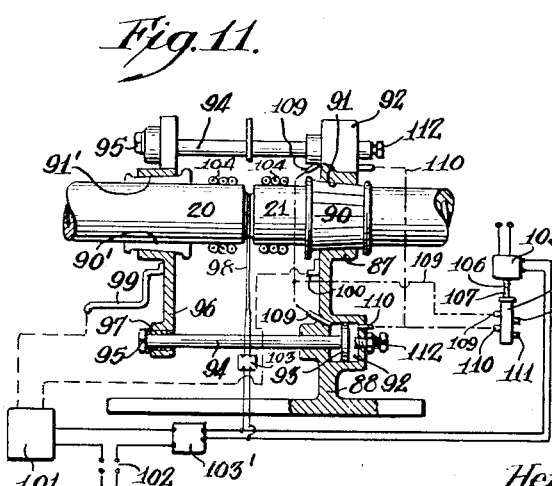
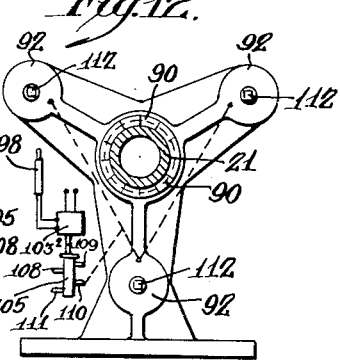
Inventor
Herbert A. Bissout and
William Y. Borresen
by their Attorneys
Witness:
Walter Chinn Patented June 6, 1944

2,350,716

UNITED STATES PATENT OFFICE 2,350,716

WELDING APPARATUS

Herbert A. Bissout, Merchantville, N. J., and William Y. Borresen, Philadelphia, Pa., assignors to W. K. Mitchell & Company, Inc., Philadelphia, Pa., a corporation of Pennsylvania Application December 13, 1939, Serial No. 308,974

9 Claims. (Cl. 78—84)

The present invention relates to apparatus for butt welding of metal pipe, or plate, at a welding groove or scarf provided by the opposing formed edges of pipe, or plate, positioned for welding.

The process claims originally contained in this application form the subject matter of our divisional application, Serial No. 355,578, filed September 6, 1940, for Welding process.

The weld members are formed at their weld edges optionally as in the prior art to provide a usual weld groove between the weld members and with thin opposing lips along the base of the weld groove.

A purpose of the invention is to secure a better weld between the lips and to avoid fins from the welded lips inward.

A further purpose is to avoid the presence of welding rod metal in the portion of a welded transverse pipe joint which contacts the medium carried by the pipe, thereby insuring that the medium comes in contact only with metal of the composition of the pipe itself, with consequently increased corrosion resistance of the welded joint.

A further purpose is to use a pyrometer-control in the pressure welding of the lips of lip-to-lip weld members to be united above the lips by arc welding.

A further purpose is to heat the lips to welding temperature by combustion from an annular burner surrounding the lips, suitably an oxy-acetylene burner.

A further purpose is to oscillate or rotate an annular burner surrounding and heating the lips, oscillating or rotating in the plane of the weld groove.

A further purpose is to mount a supply of fuel for an annular burner upon a rotatable carrier of the burner.

A further purpose is to provide novel structure for sequentially heating the lips to welding temperature and feeding the weld members into one another for pressure welding the lips, preferably with a pyrometer control of the degree of heating and/or of the pressure feeding of the weld members one into the other.

Further purposes will appear in the specification and in the claims.

We have elected to illustrate the invention in a few only of its many forms; selecting forms however that are practical and efficient in operation and which well illustrate the principles involved.

Figures 1, 2 and 3 are fragmentary longitudinal sections illustrating the application of our invention in welding a pipe at a conventional outside weld groove, the views showing successive stages of welding, respectively after placement of the weld members for lip welding, after lip welding and after completion of arc welding.

Figures 1a, 2a, 3a are views corresponding respectively to Figures 1, 2 and 3 but showing the invention applied to welding pipe at an inside weld groove.

Figures 1b, 2b, 3b, 1c, 2c, 3c and 1d, 2d and 3d are longitudinal plane sections which illustrate our invention applied to a few of many different forms of weld grooves. The subscripts b, c and d show respectively different forms of outside weld grooves, each intended to be either an inside groove or an outside groove or a groove along either side of thick plates, but it is thought that in practice each will more usually comprise an outside weld groove of thick pipe weld members.

Figure 4 is a diagrammatic longitudinal view illustrating apparatus for butt welding pipe members and with electric flash heating of the lips.

Figure 5 is an enlarged scale fragmentary view intended to show somewhat diagrammatically structure for pipe welding with burner heating of the lips.

Figures 6 and 7 are fragmentary vertical sections showing a suitable burner in guide relation to somewhat different forms of weld grooves.

Figure 8 is an enlarged sectional fragment that may be either of Figure 6 or of Figure 7.

Figure 9 is a fragmentary side elevation, in part section, of the structure of Figure 8 showing spaced burner nozzles and a tubular mount for a pyrometer to show the degree of heating of the opposing lips.

Figure 10 is a reduced scale elevation of a different way of applying and using our divided burners, showing the burners at a weld groove with one of the divided burners not yet closed to its heating position.

Figures 11 and 12 are respectively a longitudinal section and a transverse section which illustrate partly diagrammatically a different structure in accordance with the present invention, with structure for pressing the lip-to-lip members together and showing diagrammatically a pyrometer control of the degree of lip heating and of the start of pressure welding of the lips.

Like numerals refer to like parts in all figures.

Describing in illustation and not in limitation and referring to the drawings:

In electric arc butt welding of thick pipes, pipe fittings, valves or thick plates the weld members are first formed with thin projecting lips along their weld edges in such manner as to provide a weld groove or scarf between the members when the members are positioned for welding, lip-to-lip.

In the past the members have been placed for welding with a slight spacing between the opposing lips.

In the arc welding process the whole weld groove is progressively filled with electrode metal and hitherto one of the difficulties has been with the initial arc welding of the lips. If weld members are placed initially with the lips in contact, the weld between the lips is quite imperfect and when, as hitherto more usual, the weld members are placed with the lips somewhat spaced from one another, there is to less extent the same trouble with an added trouble of downward fins forming below the lips.

Where the arc welding of the lips has been imperfect, this has resulted in weakening the joint and providing a focus for corrosion or fatigue failure. At the other extreme, fins projecting from the lips into the pipe not only obstruct flow in the pipe, but are likely to break off and be carried by the medium in the pipe to pumps or other expensive equipment and there cause damage to moving parts.

One of the main objects of the present invention is to avoid these difficulties by providing mechanism for pressure welding the lips without adding electrode weld metal prior to welding the main thickness of the joint by beads of welding rod, suitably from an arc welding electrode.

In Figure 1 the weld members 20 and 21 are shown in weld position with their edges formed for welding. In accord with our invention the weld lips 22 and 23 at the bottom of the weld groove 24 are uniformly heated to welding temperature. They are then pressure welded together by feeding the members 20, 21 one into the other, providing the result indicated in Figure 2 where the opposing lips have united along their length with slight outward and inward bulgings 25 and 26.

The weld is now completed by conventional welding with welding rod, suitably electric arc welding which progressively fills the weld groove 24 with electrode metal 27 as indicated in Figure 3.

It will be understood that any conventional preheating procedure will be used, with any suitable procedure to maintain the preheating temperature during intervals in welding of alloy steel, or any other suitable metal.

Several distinct advantages are apparent in the weld of Figures 1 to 3. No finning is likely to occur, as no added weld metal is present in the welding of the lips, and the lips will not be heated until their metal is very fluid as was the case when it was desired to penetrate welding rod metal between the lips. The lips simply are heated to welding temperature and pressure applied transversely of the weld to cause fusion welding of the lips by their own metal. The danger of incomplete welding of the lips through uneven penetration of weld metal between the lips, which is always present in electric arc welding of the lips, is entirely lacking in the weld of Figures 1 to 3. Sufficient longitudinal movement of the weld members will take place to cause thorough uniting of the lips at the most widely separated point, in case there is any unevenness of contact between the lips prior to the weld.

A further advantage of the weld of Figures 1 to 3 is that the metal exposed to the medium in the pipe (at the bottom of the weld in Figures 1 to 3) is all of the same composition, the composition of the original pipe. No exposure of welding rod metal to the medium in the pipe is possible. This avoids zones of changing metal composition exposed to the medium which may become foci of corrosion.

The weld of the type of Figures 1 to 3 is particularly useful in piping intended for extremely high pressures and temperatures, such as high pressure steam piping and fittings, oil cracking equipment, and chemical process equipment. It is also desirable for oil and gas pipe lines and for general piping.

While more usually there is an easier access for welding along an outside as distinguished from an inside weld groove, the reverse is sometimes true. Having shown an outside weld groove in Figures 1, 2 and 3, we show an inside groove 24a in Figures 1a, 2a and 3a; our welding operation being as already described.

The contour of weld groove may be widely varied, for example, to suit different special conditions or views. The weld groove may, for example, have one or more steps as indicated by the step 28 in Figures 1b, 2b and 3b. The stepped groove in general secures a greater weld area and perhaps, therefore, a stronger union than the unstepped groove.

The weld lips may be formed to extend beyond the contour of the weld members' thickness, as indicated at 22a and 23a, Figures 1c, 2c and 3c. While this has some advantage in the arc welding of the prior art, since the more perfect welding above the lips extends for the full thickness of the members, it is of less advantage when welding by our process because our more perfect welding of the lips secures the needed strength without going beyond the thickness of the weld members.

Usually the small outward bulging 26, Figure 2, (outward with respect to the weld groove, inward with respect to the pipe), resulting from pressure welding the lips, is too small to matter. Sometimes, however, it may be considered preferable to avoid outward bulging beyond the thickness line of the weld members and in this event we may form the lips to be initially slightly above the thickness line of the weld. Thus in Figure 1d the lips 22b and 23b have been so formed that in welding position prior to welding they bend upwardly or inwardly, at 29, with the intent that after pressure welding their downward or outward bulging at 29' will then be merely even or nearly even with the bottom line of the weld members.

The lips may be formed as shown in Figures 1c and 1d by first manufacturing a welding groove as shown in Figure 1a and then deforming the lips to the shape shown in Figure 1c or 1d.

In the broader aspects of the invention, the weld lips are uniformly heated in any suitable way for pressure welding.

Figure 4 is intended for a diagrammatic showing of our apparatus for butt welding large pipe sections 20 and 21, and using electric resistance heating or so-called flashing of the opposing lips prior to pressure welding the lips together.

The weld members 20 and 21 are presented to one another lip-to-lip in welding position by conductor chucks 30 and 31. These chucks are electrically connected through heavy conductors 32 and 33 to a suitable heavy duty welding transformer 34. When the primary of the transformer is energized by closing a switch 35 to a suitable source of current, the current of the secondary passing through the weld members and the lips, heats the lips to welding temperature with considerable uniformity throughout the circumference.

As indicated an electrical pyrometer 36 connected by wires 36' to an indicator-relay 37 is presented toward the heating lips to show when they are at welding heat. The indicator-relay 37, when closed, connects an electrical screw-jack 38 by wires 38' to a source of current to operate the jack and bring pressure on the lips. The jack includes left- and right-screws $38^2$ oppositely threaded into the chucks 30 and 31.

When the lips are heated to welding temperature, the chucks 30 and 31 are relatively fed a short distance toward one another as by the jack 38, thereby completing the pressure welding of the lips. The primary circuit of the transformer is opened desirably as soon as the jack operates to apply pressure to the weld.

After pressure welding the lips, the weld rod welding, suitably electric arc welding, for the main portion of the weld thickness, is proceeded with in any suitable or conventional manner, progressively filling the groove 24 with beads of weld rod metal. A conventional arc electrode of the covered type is shown at 39.

The form of Figure 4 has the distinct advantage over the usual type of flash welding that relatively inexpensive equipment may be employed, for the equipment need not be capable of heating the entire weld section to welding temperature, but only capable of heating the thin lips (which may be even thinner than shown). This feature is advantageous not only in reducing the cost of the welding equipment, but also in making it possible to weld thick sections by portable flash welding equipment.

Figure 5 is intended to illustrate diagrammatically combustion heating mechanism extending annularly around the weld groove. The weld members 20' and 21' and chucks 30' and 31' may be in the main as described for Figure 4, except that there is no need for the chuck members to be electrical conductors and the housing structure of one of the chucks has been extended at 40 to support crank structure for angularly shifting the burner.

As shown, an annular burner 41 intended to comprise oppositely diametrally movable semi-circumferential portions, is mounted to surround and rotate along the weld groove 24 and in suitable guide relation with the groove.

The burner 41 presents a succession of relatively spaced burner nozzles 42 directed inwardly upon the lips. The opposing semi-circumferential portions 43 and 43' of the burner are mounted on corresponding carrier members 44 and 45 on opposite sides of one face of a wheel member 46 adapted to turn loosely on one of the weld pipes 20' or 21'. As illustrated, fuel tanks 47 and 48 for each semi-circumferential burner 43 or 43' are intended to be supported on the corresponding carrier member 44 or 45 and a pyrometer 36' is intended to be supported on one of the semi-circumferential burners 43 and 43', with the pyrometer indicator 37' on the corresponding carrier 44 or 45. The wheel 46 is intended to be rotated during operation of the burner, by means of a hand crank 49' on a shaft 49 journaling at 50 in the bracket extension 40 from the housing of the chuck 30'. The shaft 49 carries a long gear 51 in mesh with spur teeth 52 of the wheel 46.

During the heating operation the burner is rotated in the plane of the annular groove causing the flames at the nozzles 42 to follow one another around the groove, thereby avoiding the effect of inequalities of operation at the different nozzles and securing throughout the length of the lips more uniform heating than would be readily possible without rotation or oscillation of the burner.

When the welding temperature has been reached suitably as indicated by the reading of the pyrometer 36', the chuck members 30' and 31' may be fed toward one another as already described, by a suitable jack as shown in Figures 11 and 12, optionally without interrupting the operation of the annular burner until completion of the pressure welding.

When pressure welding is complete, the semi-circumferential burners 43 and 43' are backed off from opposite sides of the weld groove by operating hand wheels 53 on opposite sides of the wheel 46 and the whole wheel structure with the burners is then shifted along the gear 51, thereby carrying the burner away from the weld groove to be out of the way of arc welding. The arc welding operation is then performed as already described, using arc electrodes to progressively fill the weld groove with electrode metal. Instead of arc welding, acetylene weld-rod welding can be used to fill the groove 24.

It will be seen that each of the hand wheels 53 is mounted on a shaft 54 journaling in a lug 55 of the carrier 44 or 45 and is operatively connected by bevel gears 56 and 57 with a screw 58 journaling in a lug 59 of the carrier and downwardly threading at 60 into the wheel structure.

It is intended to use any suitable burner and that illustrated in Figures 6, 7 and 8 is intended to comprise semi-circumferential sections that together surround the weld pipes at the weld groove in suitable close relation to the weld lips. Each section 43 or 43' comprises outer and inner semi-circumferential compartments 61 and 62 for the gases for combustion. Using oxy-acetylene combustion, the outer compartment 61, for example, may be for acetylene and the inner compartment 62 for oxygen, these gases being received through suitable flexible connections not shown from drums 47 and 48. In Figure 5 the drums 47 and 48 are intended to be mounted on the carrier 44 or 45 of the burner, so that in Figure 5 each carrier 44 and 45 is intended to carry two drums, one of acetylene and one of oxygen.

Obviously the fuel drums if desired can be located away from the carriers 44 and 45, the operator then using, however, longer flexible connections to the burner and oscillating the burner back and forth during heating instead of turning the burner continuously in a single direction. The burner will move in an arcuate path following the weld lips, whether it be oscillated or rotated.

Each burner nozzle 42 comprises cooperating units 63 and 64 adjustably threading outer and inner walls 65 and 66 respectively of the burner and each unit 63 and 64 adjustably controlling the admission of acetylene or of oxygen to the nozzle.

The unit 63 comprises a nipple 67 closed at its outer end, adjustably threading the outer wall 65 of the burner and adapted to adjustably close its inner end 68 against the wall 69 separating the burner compartments 61 and 62. The outwardly closed nipple 67 carries an inner tube 70 that is open at both ends and is supported spaced from the inner wall of the closed nipple 67 by suitable longitudinal fins 71. The downwardly directed open end of the inner tube 70 makes a sliding fit through the division wall 69 of the burner.

The acetylene from the outer compartment 61 enters the outer unit 63 near the division wall of the burner, in amount adjustably determined by the position of the unit 63 with respect to the outer wall of the burner. The acetylene passes upwardly outside the inner tube 70 into the upper end of the inner tube to downwardly discharge at the lower end of the inner tube into oxygen that is adjustably admitted into the upper end 72 of the lower nipple 64.

Figures 6 and 7 show the burner in guide relation with somewhat different kinds of weld grooves.

In Figure 6 the burner carries a suitable number of brackets 73 of which one only is shown. These brackets make sliding fit on one of the upper or outer corners of the weld groove.

In Figure 7 the burner at its inner corner is provided with a suitable number of lugs 74, of which one only is shown, and which lugs make sliding fit with a step 75 of the weld groove.

The burner in operating position is in guide relation with the weld groove, extending into the groove but with a clearance at 76 to permit the relative feeding of the weld members one into the other for completion of pressure welding prior to the removal of the burner.

In the structure of Figure 5 the semi-circular burner units are moved to and from operating positions rectilinearly by the operation of the hand wheels 53 on carriers of the burners. This involves considerable structure although it permits very convenient operation of the burner and an easy shifting of the burner as soon as the pressure welding has been completed.

We illustrate in Figures 9 and 10 that much of this structure may be dispensed with. The semi-circular burner units fitting around the weld groove are there at one side provided with loose hinge spur and loop connections 77, 78 and at the other side are provided with handles 79 and 80 for manual oscillation of the combined burners after they are in position around the groove.

As seen in Figure 10 the burner units are in partial assembly, one of the units, the upper unit, having been placed in the weld groove and the other unit having been then connected to it loosely at its ends away from the handles, a spur 77 on the end of the upper unit receiving a loop projection 78 of the lower unit. The handles are to be then closed one upon the other, preferably after lighting the lower burner, which will permit the automatic lighting of the upper burner by the hand oscillation of the two burners. After the handles are together they are manually operated back and forth until the weld lips are heated to weld temperature and, suitably while the burner is continuing to operate, the weld members are pressed together to effect the pressure welding of the lips.

One of the burner units preferably carries a pyrometer indicated diagrammatically at 81 and this pyrometer is connected by suitably long flexible connections to a suitable gauge not shown. The fuel supplies are also brought to the burner units through suitably long flexible connections 82, 83 that may be carried on the respective handles, each unit being provided with a fitting 84 of well known character providing an inlet 85 to the outer compartment of the burner and an inlet 86 to the inner compartment thereof. The fitting 84 is intended to be any suitable fitting offering one connection into the outer compartment of the burner and the other connection into the inner compartment thereof.

The pyrometer 81 is intended to be removably mounted in an open tube 87 extending radially through one of the burner units, as seen in Figure 9. Optionally a number of these open tubes may be provided spaced along each burner unit and to permit checking operations of the burner near its different nozzles.

Figures 11 and 12 show one structure for feeding the weld units together after their weld lips have been heated to welding temperature and with a diagrammatic showing also of connections for resistance heating of the weld lips.

The supporting structure 88 carries a chuck 89 intended to be any chuck suitable for adequately gripping the pipe, but as shown comprises a divided wedge bushing 90 inside a taper bore 91 of the supporting structure. The structure 88 is provided with hydraulic cylinders 92 at uniformly spaced intervals, three cylinders being shown. The hydraulic rams 93 for these cylinders are on rods 94 that carry at their other ends back of heads 95, chuck supporting structure 96, the chuck being shown generally similar to that on the main support. A divided wedge bushing 90' surrounds and clamps the pipe, outwardly engaging a taper interior 91 of the supporting structure 96. The supports 88 and 96 of the two chuck members are relatively insulated from one another electrically by insulating collars 97 between the shafts 94 and the structure 96. A pyrometer 98, optionally of thermocouple type, is shown directed into the weld groove and preferably in contact with the lips, to determine the degree of heating of the lips, and intended optionally also to control thereby the operation of pressure welding.

As illustrated, electrical connections at 99 and 100 are made from the secondary of a suitably heavy duty transformer 101, to opposite sides of the weld members. A source of electrical energy to the primary side of the transformer is indicated at 102.

The pyrometer 98 suitably closes a switch 103 when electrical heating coils 104 (connected to a source of current, not shown) preheat the pipe ends to the desired degree, and the switch 103 remains closed as long as the pipe temperature is above the minimum preheat temperature.

After or when the lips heat to welding temperature, the pyrometer operates a suitable combined switch and relay 103' to shut off or moderate the energy from the transformer. As illustrated, the pyrometer 98 also operates a second combined switch and relay 103², which controls a hydraulic valve 105 for the admission of suitably high pressure fluid, as water or oil, into the hydraulic cylinders 92.

The pyrometer 98 operates the mercury switch in the switch and relay structure 103² to energize an electric magnet having a pole 106 adapted to shift the hydraulic valve element 107. When this valve element moves upwardly in Figure 11, the high pressure source 108 is connected through the valve and flexible connections 109 to the left side of the hydraulic cylinders 92, while the right side of the cylinders is at the same time connected to exhaust through tubes 110, the valve 105 and the tubing 111 from the valve.

The hydraulic rams in operation shift to the right until brought to rest by adjustable stops 112 at the right ends of the cylinders. The degree of movement is made that for effective pressure welding of the lips.

The electrical heating will by this time normally have stopped, either by an automatic control from the pyrometer as shown, or by manual operation, and by means of opening the circuit of the primary of the transformer. The arc welding operation is now proceeded with in the usual manner, filling the weld groove progressively with weld metal as already explained.

In view of our invention and disclosure variations and modifications to meet individual whim or particular need will doubtless become evident to others skilled in the art, to obtain all or part of the benefits of our invention without copying the structure shown, and we, therefore, claim all such in so far as they fall within the reasonable spirit and scope of our invention.

Having thus described our invention what we claim as new and desire to secure by Letters Patent is:

1. In butt welding of weld members having thin opposing lips together forming the bottom of a weld groove between the weld edges of the members, employing means for pressure welding the lips by pressing one member endwise toward the other, the combination of an annular burner having spaced burner outlets whose ends extend into the weld groove and are directed upon the lips and means for withdrawing the ends of the burner outlets from the groove before completing the endwise pressure application.

2. In butt welding of tubular weld members having thin opposing lips together forming the bottom of a weld groove between the weld edges of the members, employing means for pressure welding the lips by pressing one member endwise toward the other, the combination of an annular burner having burner outlets directed upon the lips at intervals of the groove length, and means for shifting the burner longitudinally of the groove for more uniform heating of the lips, the burner being guided against the weld member by contact with a wall of the groove.

3. In butt welding of weld members having thin opposing lips together forming the bottom of a weld groove, employing means for pressure welding the lips by pressing one member endwise toward the other, the combination of an annular burner support guided on the weld groove and a burner on the support having burner outlets extending into the weld groove for heating the opposing lips.

4. In mechanism for butt welding pipes and the like having a welding groove at their meeting ends with cooperating lips at the inside of the welding groove, an annular burner consisting of a plurality of segments, means for holding the segments in cooperating relation, means for adjustably radially positioning the segments and holding them in adjusted position, a plurality of arcuately positioned burner jets on each burner segment and means for supplying fuel and air separately to the jets of each segment.

5. In mechanism for butt welding pipes having a welding groove at their meeting ends with cooperating lips at the inside of the welding groove, an annular burner having a plurality of circumferentially spaced jets directed upon the lips, the jets being arranged in a plurality of separate groups, and means for adjustably moving the groups radially with respect to the welding lips and for holding the groups in any adjusted position to bring the jets to bear upon the welding lips at the inside of the groove with the proper spacing therefrom and to remove the jets from the way in the welding groove.

6. In mechanism for butt welding pipes having a welding groove at their meeting ends with cooperating lips at the inside of the welding groove, an annular burner having a plurality of circumferentially spaced jets directed upon the lips, the jets being arranged in a plurality of separate groups, means for adjustably moving the groups radially with respect to the welding lips and for holding the groups in any adjusted position to bring the jets to bear upon the welding lips at the inside of the groove with the proper spacing therefrom and to remove the jets from the way in the welding groove, and means for arcuately moving the jets to increase the uniformity of heating the lips.

7. In butt welding of pipe weld members having thin opposing lips together forming the bottom of a weld groove, the combination of arcuate burner sections together adapted to surround the lips for heating the lips to welding temperature, means for bringing the arcuate burner sections into circular relationship, a wheel support for the burner sections mounted on the pipe itself with freedom for turning movement and means for turning the support about the pipe axis.

8. In butt welding of pipe weld members having thin opposing lips together forming the bottom of a weld groove, employing means for pressure welding the lips by pressing one member endwise toward the other, the combination of divided arcuate burner sections together adapted to surround the lips for heating the lips to welding temperature, a wheel rotatable on one of the pipe members, and mounts for the arcuate burner sections on the wheel adjustable toward and away from the pipe and adapted to stay in any desired adjusted position.

9. In butt welding of pipe weld members having thin opposing lips together forming the bottom of a weld groove, employing means for pressure welding the lips by pressing one member endwise toward the other, the combination of divided arcuate burner sections together adapted to surround the lips for heating the lips to welding temperature, a wheel rotatable on one of the pipe members, mounts for the arcuate burner sections on the wheel adjustable toward and away from the pipe and adapted to stay in any desired adjusted position, and a fuel drum on one of the mounts for supplying fuel to the burner sections.

HERBERT A. BISSOUT.
WILLIAM Y. BORRESEN.